(12) United States Patent
Yamaguchi et al.

(10) Patent No.: US 12,711,996 B2
(45) Date of Patent: Aug. 18, 2026

(54) DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hayato Yamaguchi, Sagamihara Kanagawa (JP); Nobuhiro Yamamoto, Yokohama Kanagawa (JP); Taichi Okano, Yokohama Kanagawa (JP); Masahide Takazawa, Tokyo (JP)

(73) Assignees: KABUSHIKI KAISHA TOSHIBA, Kawasaki (JP); TOSHIBA ELECTRONIC DEVICES & STORAGE CORPORATION, Kawasaki (JP)

( * ) Notice: Subject to any disclaimer, the term of this patent is extended or adjusted under 35 U.S.C. 154(b) by 0 days.

(21) Appl. No.: 19/182,059

(22) Filed: Apr. 17, 2025

(65) Prior Publication Data

US 2026/0162688 A1 Jun. 11, 2026

(30) Foreign Application Priority Data

Jul. 31, 2024 (JP) ................................ 2024-124630

(51) Int. Cl.
*G11B 33/02* (2006.01)

(52) U.S. Cl.
CPC .................................. *G11B 33/02* (2013.01)

(58) Field of Classification Search
None
See application file for complete search history.

(56) References Cited

U.S. PATENT DOCUMENTS

| | | | | |
|---|---|---|---|---|
| 5,264,975 A * | 11/1993 | Bajorek | G11B 33/125 |
| 5,834,084 A * | 11/1998 | Maggio | H05K 1/056 29/841 |
| 5,966,267 A * | 10/1999 | Hooley | G11B 25/043 |
| 9,076,497 B1 * | 7/2015 | Chen | G11B 33/124 |
| 2005/0042894 A1 * | 2/2005 | Wu | H05K 3/365 |
| 2008/0007866 A1 * | 1/2008 | Hayakawa | G11B 33/02 360/97.22 |
| 2023/0061850 A1 | 3/2023 | Okano et al. | |

FOREIGN PATENT DOCUMENTS

| | | |
|---|---|---|
| JP | S62-020669 B2 | 5/1987 |
| JP | H04-049490 U | 4/1992 |
| JP | 2023-033148 A | 3/2023 |

* cited by examiner

*Primary Examiner* — Peter Vincent Agustin
(74) *Attorney, Agent, or Firm* — Knobbe, Martens, Olson & Bear, LLP

(57) ABSTRACT

A disk device according to an embodiment includes a first substrate, a second substrate, a holder, and a lead. The first substrate includes a first pad. The second substrate includes a second pad. The holder provided with a passage and a recess. The passage opens in a first direction. The recess communicates with an end of the passage in a second direction and opens in the second direction and a third direction. The lead includes a first part, a second part, a first terminal, a second terminal, and a third part. The first terminal extends from an end of the first part in a third direction. The second terminal extends from an end of the second part in the third direction. The third part is disposed in the recess and connects the first part and the second part. The passage extends between the second part and the second substrate.

17 Claims, 12 Drawing Sheets

DISK DEVICE

CROSS-REFERENCE TO RELATED APPLICATIONS

This application is based upon and claims the benefit of priority from Japanese Patent Application No. 2024-124630, filed on Jul. 31, 2024; the entire contents of which are incorporated herein by reference.

FIELD

Embodiments described herein relate generally to a disk device.

BACKGROUND

Disk devices, such as a hard disk drive, typically include a substrate as a flexible printed wiring board to electrically connect a controller and magnetic heads, and a connector mounted on the substrate. The connector includes conductive leads and a holder that holds the leads.

The magnetic disk device may be cleaned using a cleaning solution. During cleaning, the flow of the cleaning solution may face hinderance at the connector.

BRIEF DESCRIPTION OF THE DRAWINGS

FIG. 10 is an exemplary side view illustrating a relay connector according to a fifth embodiment;

FIG. 11 is an exemplary cross-sectional view illustrating a part of an HDD according to the fifth embodiment along line F11-F11 in FIG. 10; and FIG. 12 is an exemplary cross-sectional view illustrating a part of an HDD according to a sixth embodiment.

DETAILED DESCRIPTION

According to an embodiment, a disk device includes a first substrate, a second substrate, a holder, and a lead. The first substrate includes a first pad. The second substrate includes a second pad and is spaced apart from the first substrate in a first direction. The holder is located between the first substrate and the second substrate. The holder provided with a passage and a recess. The passage opens in the first direction. The recess communicates with an end of the passage in a second direction opposite the first direction and opens in the second direction and in a third direction that intersects the second direction. The lead includes a first part, a second part, a first terminal, a second terminal, and a third part. The first part is spaced apart from the first substrate and the second substrate. The second part is spaced apart from the first substrate and the second substrate, and is spaced apart from the first part in the first direction. The first terminal extends from an end of the first part in the third direction to abut on the first pad. The second terminal extends from an end of the second part in the third direction to be joined to the second pad. The third part is disposed in the recess and connects an end of the first part and an end of the second part in a fourth direction opposite the third direction. The passage extends between the second part and the second substrate.

First Embodiment

Hereinafter, a first embodiment will be described with reference to FIGS. 1 to 4. Note that, in the present specification, constituent elements according to embodiments and descriptions of the elements may be described in multiple expressions. The constituent elements and descriptions thereof are examples, and are not limited by the expressions in the present specification. The constituent elements may be specified with names different from those in the present specification. In addition, the constituent elements may be described by expressions different from the expressions in the present specification.

In the following descriptions, “suppressing” is defined as, for example, avoiding occurrence of an event, an action, or an influence, or reducing a degree of the event, the action, or the influence. In addition, in the following descriptions, “restricting” is defined as, for example, avoiding movement or rotation, or allowing the movement or rotation within a predetermined range while avoiding the movement or rotation beyond the predetermined range.

Figure 1:
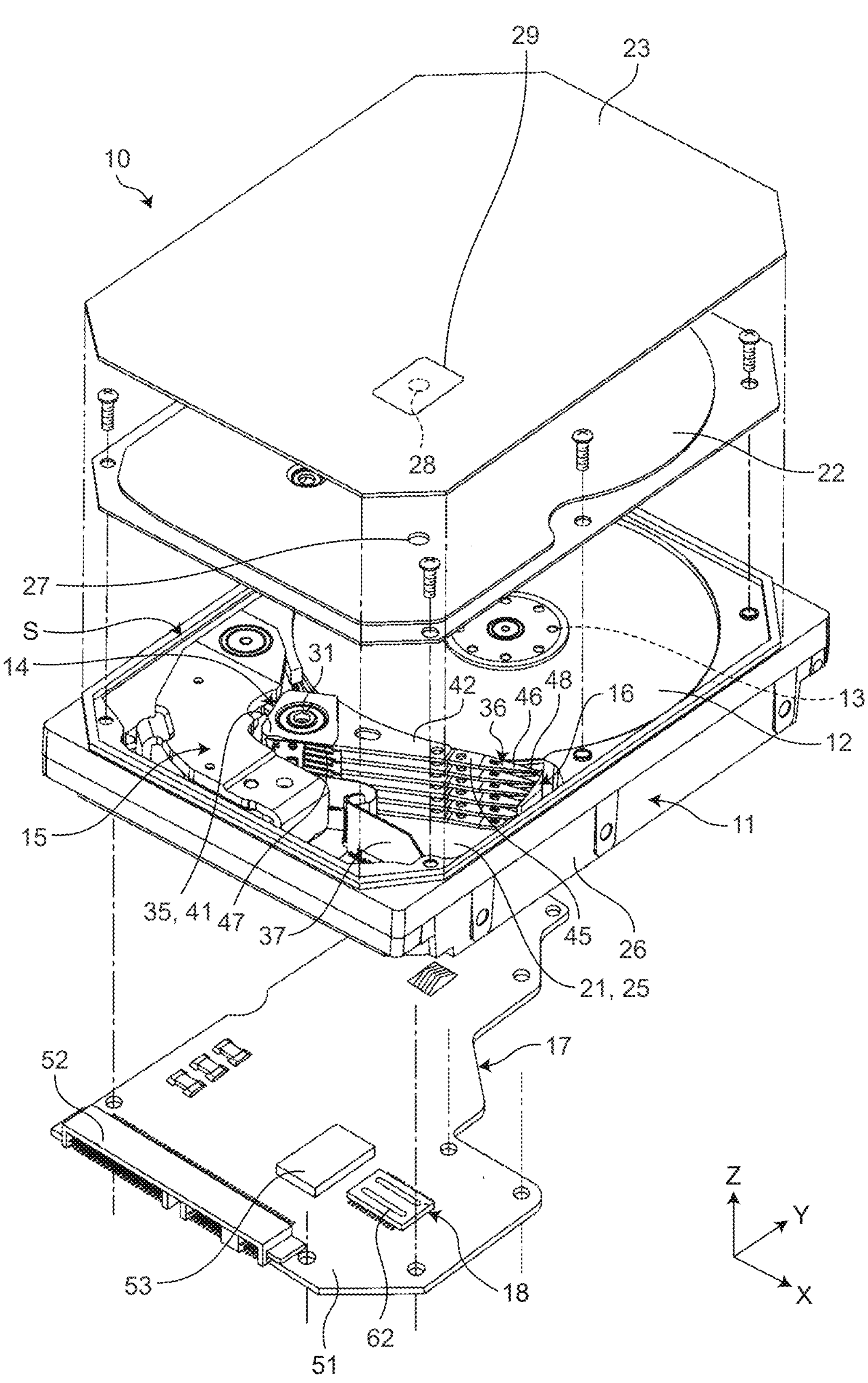
FIG. 1 is an exemplary perspective view illustrating an HDD according to a first embodiment in an exploded manner.

FIG. 1 is an exemplary perspective view illustrating a hard disk drive (HDD) 10 according to the first embodiment in an exploded manner. The HDD 10 is an example of a disk device, and may also be referred to as an electronic device, a memory device, an external memory device, or a magnetic disk device. Note that the disk device is not limited to the HDD 10.

As illustrated in each drawing, in the present specification, an X-axis, a Y-axis, and a Z-axis are defined for convenience. The X-axis, the Y-axis, and the Z-axis are orthogonal to each other. The X-axis is provided along the width of the HDD 10. The Y-axis is provided along the length of the HDD 10. The Z-axis is provided along the thickness of the HDD 10.

Furthermore, in the present specification, an X direction, a Y direction, and a Z direction are defined. The X direction is a direction along the X-axis, and includes a +X direction indicated by an arrow of the X-axis, and a −X direction, which is an opposite direction of the arrow of the X-axis. The Y direction is a direction along the Y-axis, and includes a +Y direction indicated by an arrow of the Y-axis, and a −Y direction, which is an opposite direction of the arrow of the Y-axis. The Z direction is a direction along the Z-axis, and includes a +Z direction indicated by an arrow of the Z-axis, and a −Z direction, which is an opposite direction of the arrow of the Z-axis.

As illustrated in FIG. 1, the HDD 10 includes a housing 11, a plurality of magnetic disks 12, a spindle motor 13, a head stack assembly (HSA) 14, a voice coil motor (VCM)

15, a ramp load mechanism 16, a printed circuit board (PCB) 17, and a relay unit 18. The magnetic disk 12 may also be referred to as a disk, a medium, or a platter.

The housing 11 has a box shape with an internal space S. The plurality of magnetic disks 12, the spindle motor 13, the HSA 14, the VCM 15, and the ramp load mechanism 16 are disposed in the internal space S.

The housing 11 includes a base 21, an inner cover 22, and an outer cover 23. Note that the housing 11 is not limited to this example. Each of the base 21, the inner cover 22, and the outer cover 23 is made of a metal material such as aluminum alloy. Note that the materials of the base 21, inner cover 22, and outer cover 23 may be different from each other.

The base 21 is in a substantially cuboid box shape opened in the +Z direction. The internal space S is provided inside the base 21. The base 21 includes a bottom wall 25 and a side wall 26. The bottom wall 25 is in a substantially rectangular (quadrangular) plate-like shape. The side wall 26 protrudes substantially in the +Z direction from the edge of the bottom wall 25, and is in a substantially rectangular frame-like shape.

The inner cover 22 is attached to the end of the side wall 26 in the +Z direction using, for example, a screw to seal the internal space S. The outer cover 23 covers the inner cover 22, and is attached to the end of the side wall 26 in the +Z direction by, for example, welding.

The inner cover 22 is provided with a vent 27. Furthermore, the outer cover 23 is provided with a vent 28. After the components are attached to the inside of the base 21 and the inner cover 22 and the outer cover 23 are attached to the base 21, the air inside the housing 11 is removed from the vents 27 and 28. Furthermore, the inside of the housing 11 is filled with a gas different from air.

Examples of the gas filled in the housing 11 include a low-density gas having density lower than that of air and an inert gas having a low reactivity. For example, helium is filled inside the housing 11. Note that another fluid may be filled inside the housing 11. Furthermore, the inside of the housing 11 may be maintained at vacuum, low pressure close to vacuum, or negative pressure lower than atmospheric pressure.

The vent 28 of the outer cover 23 is sealed by a seal 29. The seal 29 hermetically seals the vent 28, and restricts leakage of the fluid filled inside the housing 11 from the vent 28 to the outside of the housing 11.

The plurality of magnetic disks 12 is in a disk-like shape disposed substantially parallel to the bottom wall 25. The plurality of magnetic disks 12 is disposed at intervals in the Z direction. The HDD 10 according to the present embodiment includes, for example, ten or more magnetic disks 12. Note that the number of the magnetic disks 12 is not limited to this example.

The spindle motor 13 supports the plurality of magnetic disks 12. The plurality of magnetic disks 12 is held by a hub of the spindle motor 13 by, for example, a clamp spring. The spindle motor 13 rotates the plurality of magnetic disks 12.

The housing 11 is provided with a support shaft 31 spaced apart from the magnetic disk 12. The support shaft 31 extends, for example, substantially in the +Z direction from the bottom wall 25 of the housing 11. The HSA 14 is rotatably supported by the support shaft 31.

The HSA 14 includes a carriage 35, a plurality of head gimbal assemblies (HGAs) 36, and a flexible printed circuit board (FPC) 37. The FPC is an example of the second substrate. The carriage 35 includes an actuator block 41 and a plurality of arms 42.

The actuator block 41 and the plurality of arms 42 are integrally formed using, for example, aluminum alloy. Note that the material of the actuator block 41 and the arms 42 is not limited to this example.

The actuator block 41 is supported by the support shaft 31 via a bearing in a manner of being rotatable around the support shaft 31, for example. The plurality of arms 42 protrudes substantially in parallel from the actuator block 41.

The plurality of arms 42 is disposed at intervals in the Z direction. Each of the plurality of arms 42 may enter a gap between two adjacent magnetic disks 12 among the plurality of magnetic disks 12.

The VCM 15 includes a voice coil attached to the carriage 35, a pair of yokes, and magnets provided on the yokes. The VCM 15 rotates the carriage 35 around the support shaft 31.

Each of the plurality of HGAs 36 includes a base plate 45, a load beam 46, a flexure 47, and a magnetic head 48. The magnetic head 48 may also be referred to as a slider. The base plate 45 is attached to the distal end of the arm 42. The load beam 46 is thinner than the base plate 45, and extends from the base plate 45.

The flexure 47 is in an elongated belt shape. Note that the shape of the flexure 47 is not limited to this example. The flexure 47 is a kind of the FPC including a metal plate (backing layer) made of stainless steel or the like, an insulating layer (base layer) formed on the metal plate, a conductive layer formed on the insulating layer and constituting a plurality of wirings (wiring patterns), and an insulating layer (cover layer) covering the conductive layer.

A gimbal (elastic support), which is positioned on the load beam 46 and is displaceable, is provided at one end of the flexure 47. The magnetic head 48 is mounted on the gimbal of the flexure 47. The magnetic head 48 records and reproduces information on and from a recording layer of the magnetic disk 12. In other words, the magnetic head 48 reads and writes information from and to the magnetic disk 12.

The VCM 15 rotates the carriage 35 to arrange the magnetic head 48 at a desired position on the magnetic disk 12. When the magnetic head 48 moves to the outermost periphery of the magnetic disk 12, the ramp load mechanism 16 holds the magnetic head 48 at an unloading position spaced apart from the magnetic disk 12.

The FPC 37 is connected to another end of the flexure 47. For example, a plurality of the flexures 47 is connected to the FPC 37. Thus, the FPC 37 is electrically connected to a plurality of the magnetic heads 48 via the wirings of the plurality of flexures 47.

The PCB 17 is located outside the housing 11. The PCB 17 includes a printed wiring board (PWB) 51, an interface (I/F) connector 52, and a controller 53. Note that the PCB 17 may further include another component.

The PWB 51 is, for example, a rigid substrate such as a glass epoxy board, and is a multilayer substrate or a build-up substrate. The PWB 51 is attached to the bottom wall 25 of the base 21 by, for example, a screw. The I/F connector 52 and the controller 53 are mounted on the PWB 51.

The I/F connector 52 is a connector conforming to an interface standard such as Serial ATA (SATA). The I/F connector 52 is connected to an I/F connector of a host computer.

The controller 53 is, for example, a system-on-a-chip (SoC), and includes a read/write channel (RWC), a hard disk controller (HDC), and a processor. Note that the controller 53 may include a plurality of components individually provided on the PWB 51.

The PCB 17 is electrically connected to various components disposed inside the housing 11 via the relay unit 18. For example, the controller 53 of the PCB 17 is electrically connected to the spindle motor 13, the VCM 15, the FPC 37, and the magnetic head 48.

Figure 2:
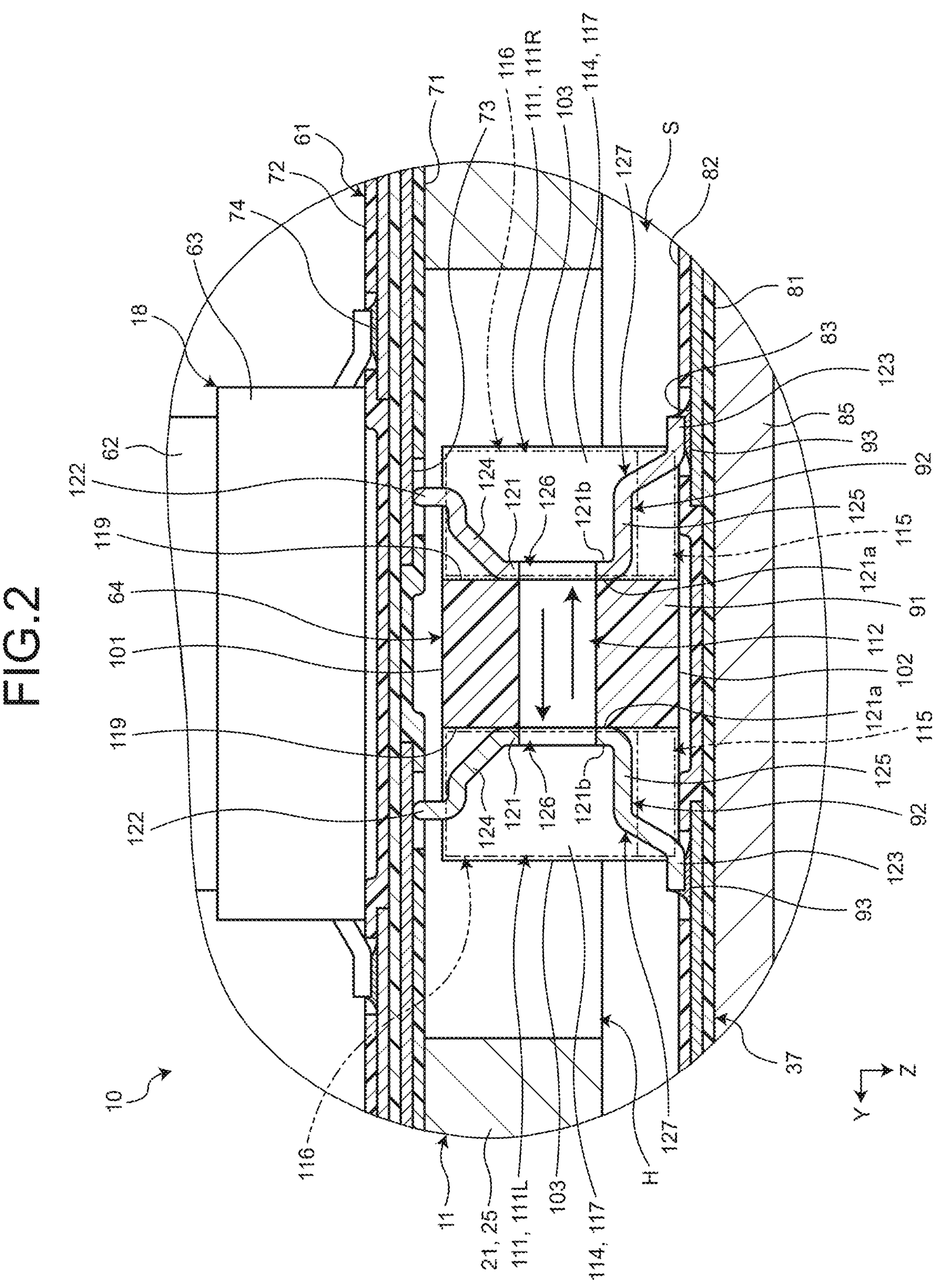
FIG. 2 is an exemplary cross-sectional view illustrating a part of the HDD according to the first embodiment.

FIG. 2 is an exemplary cross-sectional view illustrating a part of the HDD 10 according to the first embodiment. As illustrated in FIG. 2, the relay unit 18 includes a relay substrate 61 and three relay connectors 62, 63, and 64. The relay substrate 61 is an example of the first substrate.

The relay substrate 61 is, for example, a rigid substrate such as a glass epoxy board, and is a multilayer substrate or a build-up substrate. The relay substrate 61 has two surfaces 71 and 72, and a plurality of pads 73 and 74. The pad 73 is an example of a first pad.

The surfaces 71 and 72 are substantially flat. The surface 71 faces substantially in the +Z direction. The surface 72 is opposite the surface 71, and faces substantially in the −Z direction. The plurality of pads 73 is provided on the surface 71. The plurality of pads 74 is provided on the surface 72. The plurality of pads 73 and the plurality of pads 74 are electrically connected to each other by, for example, vias.

The bottom wall 25 of the base 21 is provided with a through hole H. The through hole H is an example of a fourth through hole. The through hole H penetrates the bottom wall 25 substantially in the Z direction, and allows the internal space S and the outside of the housing 11 to communicate with each other. The relay substrate 61 is attached to the bottom wall 25 to hermetically seal the through hole H. For example, the surface 71 is attached to the bottom wall 25.

The relay connector 62 is mounted on the PWB 51. The relay connector 63 is mounted on the surface 72 of the relay substrate 61. Terminals of the relay connector 63 are joined to the plurality of pads 74 by, for example, solder. The two relay connectors 62 and 63 are fitted to each other.

The relay connector 64 is what is called a compression connector, and is mounted on the FPC 37. The FPC 37 has two surfaces 81 and 82, and a plurality of pads 83. The pad 83 is an example of a second pad.

The surfaces 81 and 82 and the pad 83 are provided at one end of the FPC 37. As described above, the plurality of flexures 47 is connected to another end of the FPC 37. The surfaces 81 and 82 are substantially flat. The surface 81 faces substantially in the +Z direction. The surface 82 is opposite the surface 81, and faces substantially in the −Z direction. The plurality of pads 83 is provided on the surface 82.

A reinforcing plate 85 is attached to one end of the FPC 37. For example, the reinforcing plate 85 is attached to the surface 81. The reinforcing plate 85 keeps the surfaces 81 and 82 substantially flat, and supports the relay connector 64 via the FPC 37. One end of the FPC 37 is attached to, together with the reinforcing plate 85, the bottom wall 25 by, for example, a screw.

One end of the FPC 37 is spaced apart from the relay substrate 61 in the +Z direction. The +Z direction is an example of a first direction. The surface 71 of the relay substrate 61 and the surface 82 of the FPC 37 face each other across, for example, the through hole H.

Figure 3:
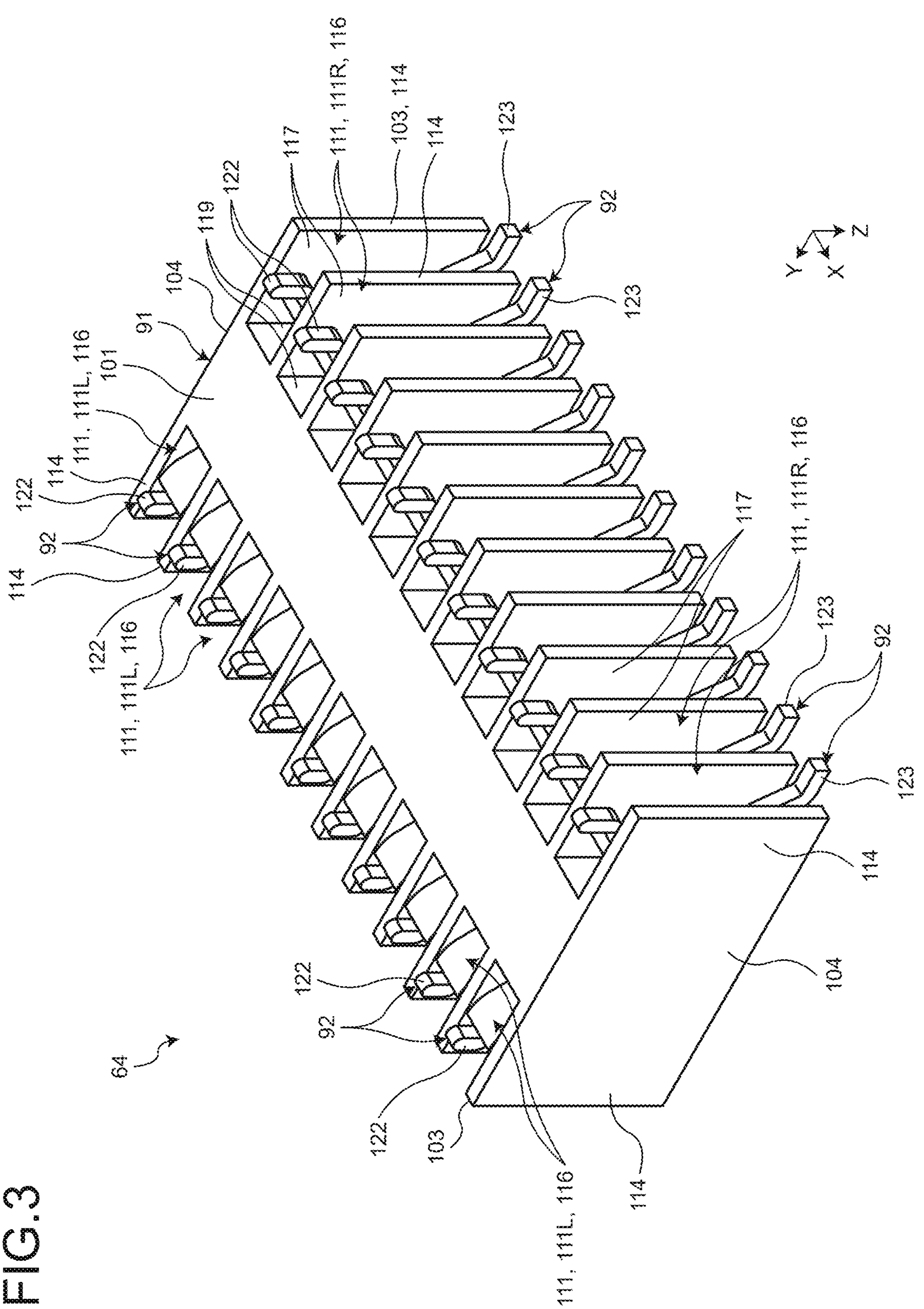
FIG. 3 is an exemplary perspective view illustrating a relay connector according to the first embodiment.
Figure 4:
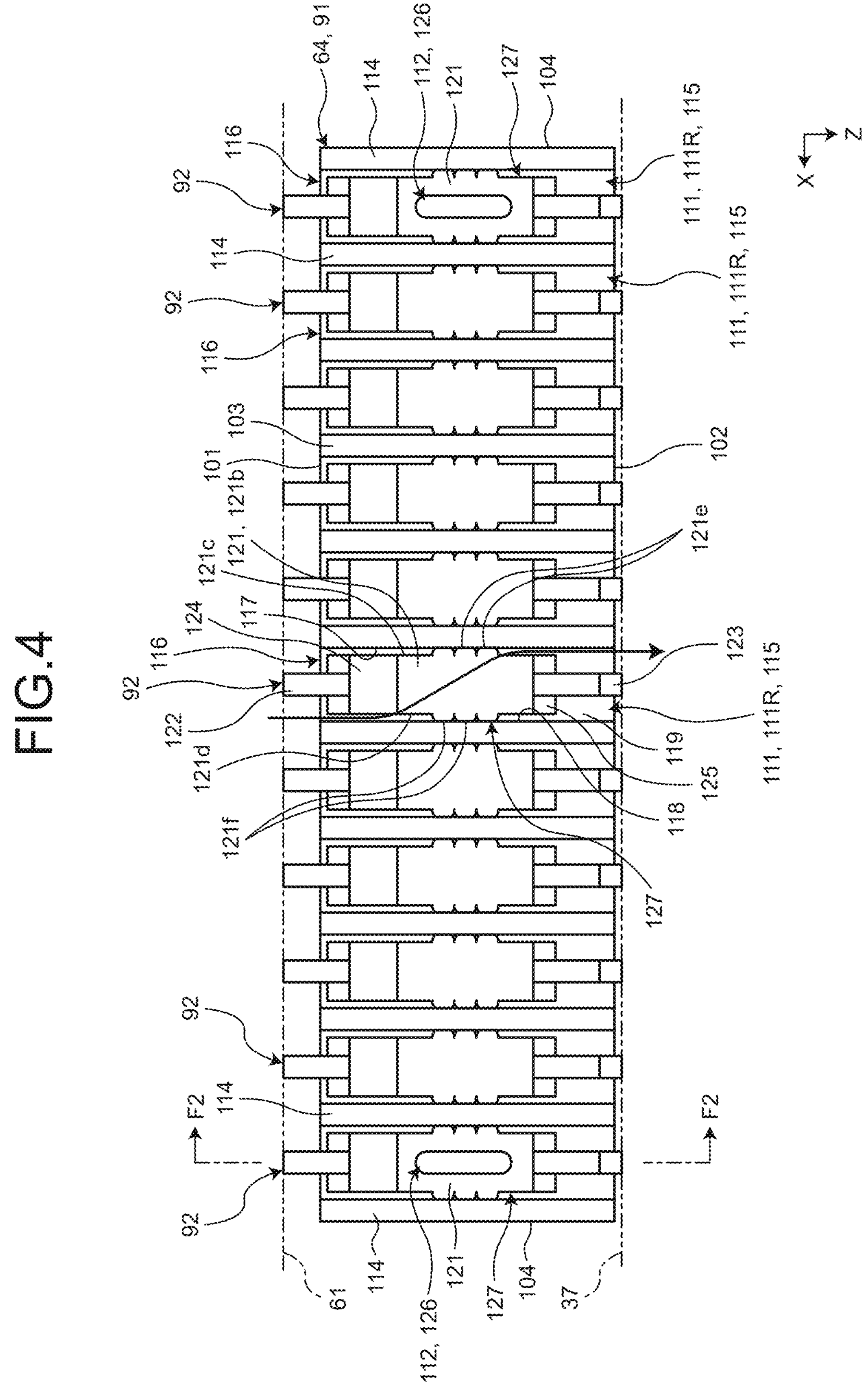
FIG. 4 is an exemplary side view illustrating the relay connector according to the first embodiment.

FIG. 3 is an exemplary perspective view illustrating the relay connector 64 according to the first embodiment. FIG. 4 is an exemplary side view illustrating the relay connector 64 according to the first embodiment. FIG. 2 illustrates a cross section of a part of the HDD 10 along line F2-F2 illustrated in FIG. 4.

FIG. 4 virtually illustrates the FPC 37 and the relay substrate 61 by a chain double-dashed line. As illustrated in FIG. 4, the relay connector 64 is located between one end of the FPC 37 and the relay substrate 61. As illustrated in FIG. 3, the relay connector 64 includes a holder 91 and a plurality of leads 92. The holder 91 may also be referred to as a housing or a case.

The holder 91 holds the plurality of leads 92. In other words, the plurality of leads 92 is attached to the holder 91. As illustrated in FIG. 2, the plurality of leads 92 is joined to the pads 83 of the FPC 37 by solder 93. As a result, the relay connector 64 is mounted on the surface 82 of the FPC 37. Note that the relay connector 64 may be mounted on the surface 71 of the relay substrate 61.

The lead 92 electrically connects the pad 83 of the FPC 37 and the pad 73 of the relay substrate 61 via the through hole H. As a result, the controller 53 is electrically connected to the magnetic heads 48 via the PWB 51, the relay connectors 62 and 63, the relay substrate 61, the relay connector 64, the FPC 37, and the flexure 47. The controller 53 controls the magnetic heads 48.

For example, the holder 91 is in a substantially cuboid box shape extending in the X direction. The holder 91 is made of, for example, a synthetic resin such as liquid crystal polymer (LCP) resin. Note that the shape and material of the holder 91 are not limited to those examples.

As illustrated in FIG. 4, the holder 91 has a top surface 101, a bottom surface 102, two outer surfaces 103, and two end surfaces 104. Note that, in the present embodiment, the expressions "top" and "bottom" are expressions for the sake of convenience based on the arrangement of FIG. 4, for example, and do not limit the position, orientation, and usage mode. The top surface 101 is an example of a first end surface. The bottom surface 102 is an example of a second end surface.

The top surface 101, the bottom surface 102, the outer surface 103, and the end surface 104 are substantially flat. Note that the top surface 101, the bottom surface 102, the outer surface 103, and the end surface 104 may be curved surfaces, or may be provided with irregularities.

As illustrated in FIG. 2, the top surface 101 faces substantially in the −Z direction. The top surface 101 and the surface 71 of the relay substrate 61 face each other. The bottom surface 102 is opposite the top surface 101, and faces substantially in the +Z direction. The bottom surface 102 and the surface 82 of the FPC 37 face each other. The bottom surface 102 may be supported by the surface 82.

The two outer surfaces 103 are provided at both ends of the holder 91 in the Y direction, and extend substantially in the Z direction between the top surface 101 and the bottom surface 102. One of the outer surfaces 103 faces substantially in the +Y direction. The other one of the outer surfaces 103 faces substantially in the −Y direction.

As illustrated in FIG. 4, the two end surfaces 104 are provided at both ends of the holder 91 in the X direction, and extend substantially in the Z direction between the top surface 101 and the bottom surface 102. One of the end surfaces 104 faces substantially in the +X direction. The other one of the end surfaces 104 faces substantially in the −X direction.

The holder 91 is provided with a plurality of grooves 111 and two through holes 112. The through holes 112 are an example of a flow path. Note that the number of the through holes 112 is not limited to this example. The plurality of leads 92 is fitted into the plurality of grooves 111.

As illustrated in FIG. 3, the plurality of grooves 111 includes a plurality of grooves 111R and a plurality of grooves 111L. The plurality of grooves 111R and the plurality of grooves 111L are in mirror symmetry with respect to the center of the holder 91 in the Y direction. Hereinafter, the groove 111R and the lead 92 fitted in the groove 111R will be mainly described. The groove 111L and the lead 92 fitted in the groove 111L may be understood by interchanging the +Y direction and the −Y direction in the description of the groove 111R and the lead 92.

As illustrated in FIG. 2, in the present embodiment, each of the plurality of grooves 111R is dented in the +Y direction from the outer surface 103 facing the −Y direction. The +Y direction is an example of a groove-dented direction. The groove 111R extends from the top surface 101 to the bottom surface 102.

Each of the plurality of grooves 111R opens to the top surface 101, the bottom surface 102, and the outer surface 103 facing in the −Y direction. In other words, each of the plurality of grooves 111R is opened in the −Y direction, the +Z direction, and the −Z direction. The −Z direction is an example of a second direction. The −Y direction is an example of a third direction. The +Y direction is an example of a fourth direction.

As illustrated in FIG. 3, the plurality of grooves 111R is arranged in the Y direction. The plurality of grooves 111L is also arranged in the Y direction. In other words, the plurality of grooves 111 is arranged in two rows in the Y direction. Thus, the holder 91 has a plurality of side walls 114. Each of the plurality of grooves 111 is provided between every two adjacent side walls of the plurality of side walls 114.

As illustrated in FIG. 2, each of the plurality of grooves 111 includes a lower groove (lower recess) 115 and an upper groove (upper recess) 116. The lower groove 115 is an example of a passage. The upper groove 116 is an example of a recess. In FIG. 2, the lower groove 115 and the upper groove 116 are virtually separated by a chain double-dashed line. The chain double-dashed line indicates the lower groove 115 and the upper groove 116 slightly smaller for understanding.

The lower groove 115 is a part of the groove 111 in the Z direction, and the upper groove 116 is another part of the groove 111 in the Z direction. The lower groove 115 and the upper groove 116 are adjacent to each other in the Z direction. A cross section of the lower groove 115 orthogonal to the Z direction and a cross section of the upper groove 116 orthogonal to the Z direction are substantially the same. Note that the lower groove 115 and the upper groove 116 are not limited to those examples.

The lower groove 115 of the groove 111R opens to the bottom surface 102 and to the outer surface 103 facing in the −Y direction. In other words, the lower groove 115 of the groove 111R is open in the +Z direction and in the −Y direction. The lower groove 115 extends substantially in the −Z direction from the bottom surface 102.

The upper groove 116 communicates with an end of the lower groove 115 in the −Z direction. In the present embodiment, the upper groove 116 is continuous with the lower groove 115. The upper groove 116 of the groove 111R opens to the top surface 101 and to the outer surface 103 facing in the −Y direction. In other words, the upper groove 116 of the groove 111R is opened in the −Z direction and in the −Y direction. The upper groove 116 extends substantially in the +Z direction from the top surface 101.

As illustrated in FIG. 4, the holder 91 includes a plurality of side surfaces 117, 118, and 119 that define each of the plurality of grooves 111. In other words, the side surfaces 117, 118, and 119 define the lower groove 115 and the upper groove 116. The side surfaces 117 and 118 are examples of a first side surface. The side surface 119 is an example of a second side surface and an inner end surface.

The side surfaces 117, 118, and 119 are substantially flat. Thus, the side surfaces 117, 118, and 119 extend straight between the top surface 101 and the bottom surface 102. The side surface 117 is provided at an end of the groove 111 in the −X direction, and faces substantially in the +X direction. The side surface 118 is provided at an end of the groove 111 in the +X direction, and faces substantially in the −X direction.

As illustrated in FIG. 2, the side surface 119 of the groove 111R is located at an end of the groove 111 (lower groove 115 and upper groove 116) in the +Y direction, and faces substantially in the −Y direction. The side surface 119 connects the ends of the two side surfaces 117 and 118 in the +Y direction.

The two side surfaces 117 and 118 face each other across the groove 111. The groove 111 extends between the two side surfaces 117 and 118. In other words, the two side surfaces 117 and 118 define the groove 111 (lower groove 115 and upper groove 116).

As illustrated in FIG. 4, each of the plurality of side walls 114 includes the side surfaces 117 and 118. In one side wall 114, the side surface 117 and the side surface 118 are opposite to each other. The side wall 114 defining the groove 111R protrudes in the −Y direction from the side surface 119.

As illustrated in FIG. 2, each of the two through holes 112 opens to the two opposing side surfaces 119, and allows one of the plurality of grooves 111R and one of the plurality of grooves 111L to communicate with each other. The through hole 112 communicates with, for example, the upper groove 116 of the groove 111. Note that, instead of the through hole 112, a flow path that allows the side surface 119 to communicate with the top surface 101, the bottom surface 102, or the end surface 104 may be provided in the holder 91.

As illustrated in FIG. 4, the two through holes 112 allows two of the plurality of grooves 111R arranged in the Y direction positioned at both ends and two of the plurality of grooves 111L arranged in the Y direction positioned at both ends to communicate with each other. Note that the plurality of through holes 112 may allow all of the plurality of grooves 111R and all of the plurality of grooves 111L to communicate with each other.

As illustrated in FIG. 2, each of the plurality of leads 92 includes an intermediate part 121, two terminals 122 and 123, and two connecting parts 124 and 125. The intermediate part 121 is an example of a third part. The terminal 122 is an example of a first terminal. The terminal 123 is an example of a second terminal. The connecting part 124 is an example of a first part. The connecting part 125 is an example of a second part.

In the present embodiment, the intermediate part 121, a part of the terminal 122, a part of the terminal 123, the connecting part 124, and the connecting part 125 are disposed in the groove 111. Note that the terminals 122 and 123 and the connecting parts 124 and 125 may be at least partially positioned outside the groove 111.

The intermediate part 121 extends substantially in the Z direction along the side surface 119 of the holder 91. Thus, the side surface 119 faces the intermediate part 121. The intermediate part 121 has two surfaces 121*a* and 121*b*. The surface 121*a* and the side surface 119 face each other. The surface 121*a* may be in contact with the side surface 119, or may be slightly spaced apart from the side surface 119. The surface 121*b* is opposite the surface 121*a*.

As illustrated in FIG. 4, the intermediate part 121 further includes two edges 121*c* and 121*d* and a plurality of protrusions 121*e* and 121*f*. The two edges 121*c* and 121*d* extend between the edge of the surface 121*a* and the edge of the surface 121*b*. The two edges 121*c* and 121*d* oppose each other.

The edge 121*c* and the side surface 117 of the holder 91 face each other. The edge 121*d* and the side surface 118 of the holder 91 face each other. In other words, the two edges 121*c* and 121*d* face the two side surfaces 117 and 118.

The plurality of protrusions 121*e* protrude from the edge 121*c* to the side surface 117. The protrusion 121*e* abuts on the side surface 117. The plurality of protrusions 121*f* protrude from the edge 121*d* to the side surface 118. The protrusions 121*f* abut on the side surface 118. As a result, the intermediate part 121 is attached to the holder 91 while held between the two side surfaces 117 and 118. Note that the intermediate part 121 may be attached to the holder 91 by another method. In addition, another part of the lead 92 may be attached to the holder 91.

The plurality of leads 92 is attached to the plurality of grooves 111, thereby being arranged in two rows in the Y direction. Through holes 126 are provided in two of the plurality of leads 92 arranged in the Y direction positioned at both ends. The through hole 126 is an example of a second through hole.

The intermediate part 121 is provided with the through hole 126. As illustrated in FIG. 2, the through hole 126 penetrates the intermediate part 121, and opens to the two surfaces 121*a* and 121*b*. The through hole 126 communicates with the through hole 112 of the holder 91.

The terminal 122 is provided at one end of the lead 92. For example, the terminal 122 extends between the groove 111 and the outside to protrude from the top surface 101 of the holder 91. The terminal 122 abuts on the pad 73 of the relay substrate 61 outside the groove 111.

The terminal 123 is provided at the other end of the lead 92. For example, the terminal 123 extends between the groove 111 and the outside to protrude from the outer surface 103 of the holder 91. The terminal 123 is joined to the pad 83 of the FPC 37 outside the groove 111 using the solder 93.

The connecting part 124 connects the −Z directional end of the intermediate part 121 and the terminal 122. The connecting part 124 in the groove 111R extends approximately in the −Y direction from the −Z directional end of the intermediate part 121. For example, the connecting part 124 extends from the intermediate part 121 toward the pad 83 in an oblique direction between the −Y direction and the −Z direction. Note that the connecting part 124 is not limited to this example.

The connecting part 124 is spaced apart from the FPC 37 and the relay substrate 61. The terminal 122 extends substantially in the −Z direction from the end of the connecting part 124 in the −Y direction toward the pad 73 of the relay substrate 61.

The connecting part 125 connects the end of the intermediate part 121 in the +Z direction with the terminal 123. The connecting part 125 in the groove 111R extends substantially in the −Y direction from the end of the intermediate part 121 in the +Z direction. In other words, the connecting part 125 extends substantially parallel to the surface 82 of the FPC 37.

The connecting part 125 is spaced apart from the FPC 37 and the relay substrate 61. The connecting part 125 is spaced apart from the connecting part 124 in the +Z direction. The terminal 123 in the groove 111R extends from the −Y directional end of the connecting part 125 toward the pad 83 of the FPC 37 in an oblique direction between the +Z direction and the −Y direction. Note that the terminal 123 is not limited to this example.

The terminals 122 and 123 and the connecting parts 124 and 125 extend between the two side surfaces 117 and 118. As illustrated in FIG. 4, each of the terminals 122 and 123 and the connecting parts 124 and 125 is spaced apart from the side surfaces 117 and 118. In other words, the width of each of the terminals 122 and 123 and the connecting parts 124 and 125 in the X direction is narrower than the width of the groove 111, and is narrower than the width of the intermediate part 121.

The width of each of the terminals 122 and 123 in the X direction is narrower than the width of each of the connecting parts 124 and 125 in the X direction. Note that the terminals 122 and 123 and the connecting parts 124 and 125 are not limited to those examples. For example, the width of the connecting parts 124 and 125 may decrease toward the terminals 122 and 123.

As illustrated in FIG. 2, the intermediate part 121 connects the end of the connecting part 124 and the end of the connecting part 125 in the +Y direction. Both of the connecting parts 124 and 125 protrude from the surface 121*b* of the intermediate part 121. In other words, the lead 92 is substantially in a U shape. The lead 92 can be elastically deformed so that the terminal 122 and the terminal 123 are closer to each other.

The length of the lead 92 in the Z direction is longer than the distance between the surface 82 of the FPC 37 and the surface 71 of the relay substrate 61. Thus, the lead 92 is compressed between the FPC 37 and the relay substrate 61. In other words, the lead 92 is elastically deformed so that the two terminals 122 and 123 are closer to each other, and exerts an elastic force to press the terminal 122 onto the pad 73.

As described above, the intermediate part 121, a part of the terminal 122, a part of the terminal 123, the connecting part 124, and the connecting part 125 are disposed in the groove 111. That is, the lead 92 includes a built-in part 127 in the groove 111, and the built-in part 127 includes the intermediate part 121 and the connecting parts 124 and 125. The built-in part 127 is an example of a fourth part. The built-in part 127 is provided between the terminal 122 and the terminal 123. With the built-in part 127 being elastically deformed, the lead 92 presses the terminal 122 against the pad 73 by elastic force.

The lower groove 115 of the groove 111 extends between the connecting part 125 and the FPC 37. On the other hand, the upper groove 116 of the groove 111 extends between the lower groove 115 and the relay substrate 61. The intermediate part 121, a part of the terminal 122, the connecting part 124, and the connecting part 125 are disposed in the upper groove 116. A part of the terminal 123 is disposed in the lower groove 115.

Hereinafter, a part of a method of mounting the relay connector 64 on the FPC 37 will be exemplified. Note that the method of mounting the relay connector 64 on the FPC 37 is not limited to the following method, and another method may be used. First, solder paste (solder 93) is supplied to the pad 83 by, for example, printing or coating. Furthermore, the relay connector 64 is mounted on the pad 83.

Next, the FPC 37 is heated in a reflow furnace, and the solder paste melts. As a result, the terminal 123 of the relay connector 64 is joined to the pad 83 by the solder 93. At this time, flux mixed in or separately supplied to the solder 93 may flow out of the solder 93.

The solder paste is attached to the terminal 123. When the solder paste melts, the solder 93 and the flux spread along the terminal 123. For example, the flux may spread toward the connecting part 125 through the terminal 123.

Next, the FPC 37 and the relay connector 64 are cleaned by, for example, ultrasonic cleaning. For example, the FPC 37 is placed in a tank filled with a cleaning solution. The cleaning solution removes substances that may contaminate the HDD 10, such as flux.

For example, as schematically illustrated by an arrow in FIG. 4, the cleaning solution may flow into the upper groove 116 from the outside through the gap between the connecting part 124 and the side surfaces 117 and 118. Furthermore, the cleaning solution may flow into the lower groove 115 from the upper groove 116 through the gap between the connecting part 125 and the side surfaces 117 and 118. Note that the direction of the flow of the cleaning solution is not limited to this example.

In the lower groove 115, the cleaning solution may clean the surface 82 of the FPC 37. Furthermore, the lower groove 115 is relatively wide. Thus, the lower groove 115 may suppress residues of the cleaning solution and the flux in the lower groove 115.

The cleaning solution and the flux are likely to remain in two of the plurality of grooves 111R arranged in the Y direction positioned at both ends and in two of the plurality of grooves 111L arranged in the Y direction positioned at both ends. However, as schematically illustrated by an arrow in FIG. 2, for example, the cleaning solution may flow through the through hole 126 of the lead 92 and the through hole 112 of the holder 91. As a result, the through holes 112 and 126 may suppress residues of the cleaning solution and the flux in the two of the plurality of grooves 111R and in the two of the plurality of grooves 111L.

For example, the cleaning solution transmits ultrasonic waves. The ultrasonic waves cause the flux to float. Thereafter, the cleaning solution is discharged together with the flux. When the ultrasonic cleaning is complete, the FPC 37 is taken out of the cleaning solution. In this manner, the mounting of the relay connector 64 on the FPC 37 is complete.

In the HDD 10 according to the first embodiment described above, the relay substrate 61 includes the pad 73. The FPC 37 includes the pad 83 and is spaced apart from the relay substrate 61 in the +Z direction. The holder 91 is provided with the lower groove 115 and the upper groove 116. The lower groove 115 is open in the +Z direction. The upper groove 116 is connected to the end of the lower groove 115 in the −Z direction opposite the +Z direction, and is open in the −Z direction and in the −Y direction intersecting the −Z direction. The holder 91 is located between the relay substrate 61 and the FPC 37. The lead 92 includes the connecting part 124, the connecting part 125, the terminal 122, the terminal 123, and the intermediate part 121. The connecting part 124 is spaced apart from the relay substrate 61 and the FPC 37. The connecting part 125 is spaced apart from the relay substrate 61 and the FPC 37, and is spaced apart from the connecting part 124 in the +Z direction. The terminal 122 extends from the end of the connecting part 124 in the −Y direction to abut on the pad 73. The terminal 123 extends from the end of the connecting part 125 in the −Y direction to be joined to the pad 83. The intermediate part 121 is disposed in the upper groove 116, and connects the end of the connecting part 125 and the end of the connecting part 124 in the +Y direction opposite the −Y direction. The lower groove 115 extends between the connecting part 125 and the FPC 37.

The lower groove 115 and the upper groove 116 communicate with each other, forming the integral groove 111 penetrating the holder 91 in the −Z direction and the +Z direction. Thus, for cleaning the FPC 37 using the cleaning solution, the holder 91 is less likely to hinder the flow of the cleaning solution, as compared with the case where the space between the connecting part 125 and the FPC 37 is closed. As a result, the HDD 10 according to the present embodiment can ensure that the holder 91 and the lead 92 are properly cleaned. For example, the terminal 123 is joined to the pad 83 with the solder 93. The flux may flow out from the solder 93. However, the HDD 10 according to the present embodiment can ensure the removal of the flux, reducing or avoiding the occurrence of a head crash caused by contamination.

To put it another way, the holder 91 has the top surface 101, the bottom surface 102, the outer surface 103, and the side surface 119. The top surface 101 faces the relay substrate 61. The bottom surface 102 faces the FPC 37. The outer surface 103 extends between the top surface 101 and the bottom surface 102. The groove 111 is dented in the +Y direction from the outer surface 103, and opens to the top surface 101 and the bottom surface 102. The side surface 119 is located at the end of the groove 111 in the +Y direction, and extends straight between the top surface 101 and the bottom surface 102. The lead 92 includes the built-in part 127 in the groove 111 between the two terminals 122 and 123. In other words, the groove 111 penetrates the holder 91 straight between the top surface 101 and the bottom surface 102. The built-in part 127 of the lead 92 is located in the groove 111. Thereby, the HDD 10 is less likely to hinder the flow of the cleaning solution in the groove 111, further ensuring that the holder 91 and the lead 92 are properly cleaned.

The intermediate part 121, rather than the connecting part 125, is attached to the holder 91. Attaching the connecting part 125 to the holder 91 will enlarge the connecting part 125 in size. In the HDD 10 according to the present embodiment, the connecting part 125 can be avoided from increasing in size and closing the groove 111 (lower groove 115 and upper groove 116).

The holder 91 has the two side surfaces 117 and 118 facing each other to define the upper groove 116. The intermediate part 121 has the two edges 121*c* and 121*d* and the plurality of protrusions 121*e* and 121*f*. The two edges 121*c* and 121*d* oppose each other and face the two side surfaces 117 and 118. The plurality of protrusions 121*e* and 121*f* protrude from the two edges 121*c* and 121*d* to abut on the two side surfaces 117 and 118. The intermediate part 121 is held between the two side surfaces 117 and 118. By such a simple structure, the intermediate part 121 can be firmly attached to the holder 91.

The connecting part 125 is at least partially disposed in the upper groove 116 and is spaced apart from the two side surfaces 117 and 118. This arrangement can allow the cleaning solution to pass through the gap between the connecting part 125 and the side surfaces 117 and 118. Consequently, the connecting part 125 is less likely to hinder the flow of the cleaning solution as compared with the connecting part 125 being in contact with at least one of the two side surfaces 117 and 118.

The holder 91 has the side surface 119 at the end of the upper groove 116 in the +Y direction, the side surface 119 facing the intermediate part 121. The holder 91 is provided with the through hole 112 opening to the side surface 119. Such an arrangement allows the cleaning solution to flow into the upper groove 116 through the through hole 112 and flow out from the upper groove 116. In this manner, the cleaning solution can more efficiently clean the upper groove 116.

The intermediate part 121 is provided with the through hole 126 communicating with the through hole 112. Because of this, the cleaning solution can flow into the upper groove 116 from the through hole 112 through the through hole 126, and flow out from the upper groove 116 to the through hole 112 through the through hole 126. In other words, the intermediate part 121 can be avoided from hindering the flow of the cleaning solution.

The holder 91 has the two side surfaces 117 and 118 and the side surface 119. The two side surfaces 117 and 118 face each other. The side surface 119 connects the ends of the two side surfaces 117 and 118 in the +Y direction. The side surfaces 117, 118, and 119 define the lower groove 115 and the upper groove 116. That is, the lower groove 115 is not a hole but a cutout opening together with the upper groove 116 in the −Y direction. The lower groove 115 and the upper groove 116 penetrate the holder 91 in the −Z direction and the +Z direction and open in the −Y direction, forming the integral groove 111. Such a holder 91 is less likely to hinder the flow of the cleaning solution than the holder 91 with a hole surrounded by a wall instead of the lower groove 115.

The lead 92 is elastically deformed so that the connecting part 124 and the connecting part 125 are closer to each other. Thus, the lead 92 can press the terminal 122 onto the pad 73 by elastic force, ensuring the power supply between the pad 74 and the pad 83.

Second Embodiment

Hereinafter, a second embodiment will be described with reference to FIG. 5. Note that, in the following descriptions of a plurality of embodiments, constituent elements having functions similar to those of the constituent elements already described are denoted by the same reference signs as those of the constituent elements already described, and descriptions thereof may be omitted. In addition, a plurality of constituent elements denoted by the same reference signs do not necessarily have all functions and properties in common, and may have different functions and properties according to individual embodiments.

Figure 5:
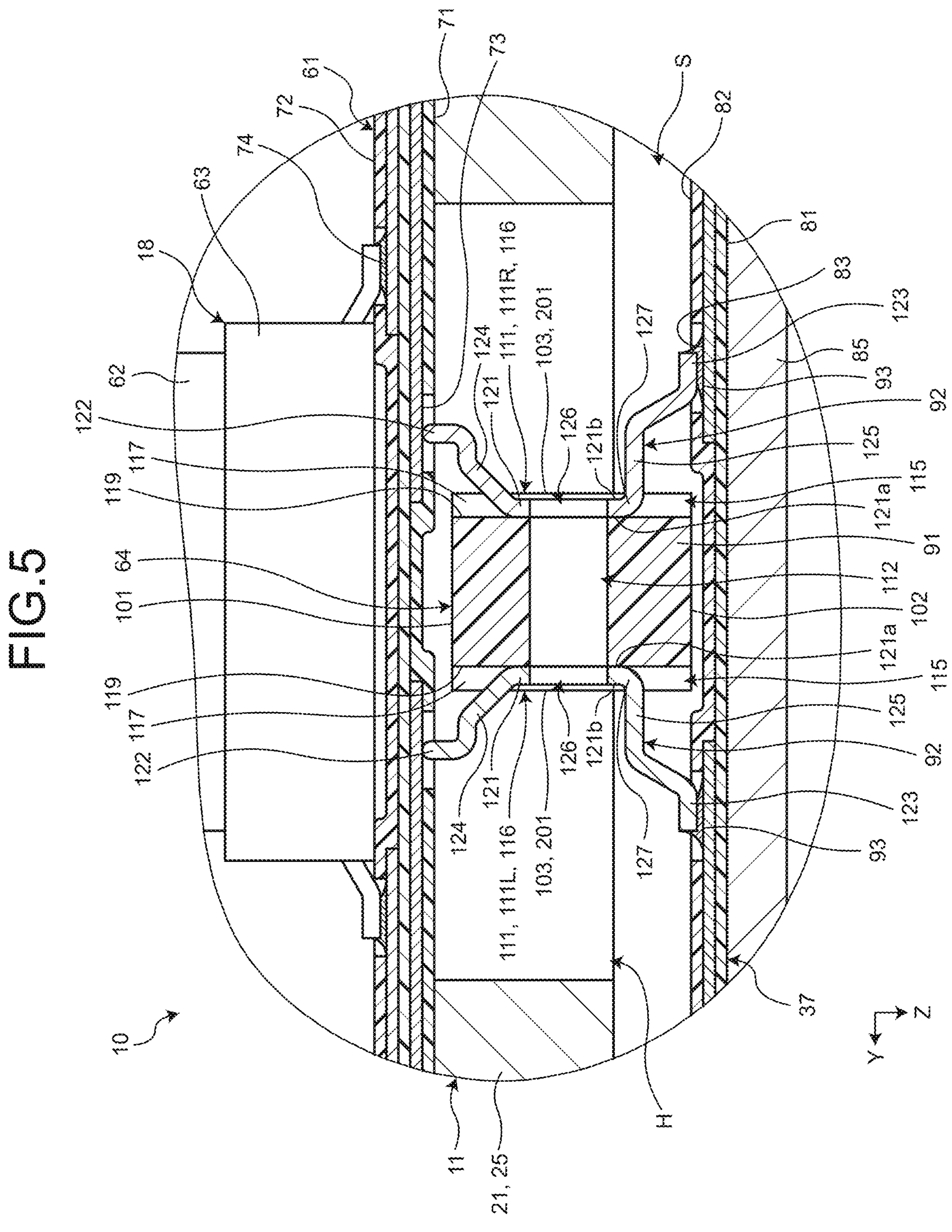
FIG. 5 is an exemplary cross-sectional view illustrating a part of an HDD according to a second embodiment.

FIG. 5 is an exemplary cross-sectional view illustrating a part of an HDD 10 according to the second embodiment. As illustrated in FIG. 5, a holder 91 according to the second embodiment includes a plurality of side walls 201 instead of a plurality of side walls 114. The side walls 201 are substantially equivalent to the side walls 114 except the respects to be described below.

The side wall 201 according to the second embodiment is shorter in the Y direction than the side wall 114 according to the first embodiment. Thus, a terminal 122 of a lead 92, a terminal 123, at least a part of a connecting part 124, and at least a part of a connecting part 125 are located outside an upper groove 116. An intermediate part 121 is disposed in the upper groove 116. The length (depth) of the upper groove 116 in the Y direction is larger than the length (thickness) of the intermediate part 121 in the Y direction.

Since the side wall 201 is shorter, a space between the connecting part 125 and an FPC 37 is opened in an X direction. Furthermore, the terminals 122 and 123 and the connecting parts 124 and 125 are exposed to a cleaning solution flowing in the X direction. The cleaning solution may pass through the space between the connecting part 125 and the FPC 37 in the X direction. Thus, the cleaning solution may clean the narrow gap between the terminal 123 and the FPC 37, for example. In addition, the terminals 122 and 123 and the connecting parts 124 and 125 may be exposed to ultrasonic waves without being blocked by the side wall 201.

In the HDD 10 according to the second embodiment as described above, at least a part of the connecting part 124, at least a part of the connecting part 125, the terminal 122, and the terminal 123 are located outside the upper groove 116. In other words, at least a part of the connecting part 124, at least a part of the connecting part 125, the terminal 122, and the terminal 123 are not covered by the holder 91 but exposed. Thus, the connecting part 124, the connecting part 125, the terminal 122, and the terminal 123 can be more exposed to the cleaning solution and properly cleaned.

Third Embodiment

Figure 6:
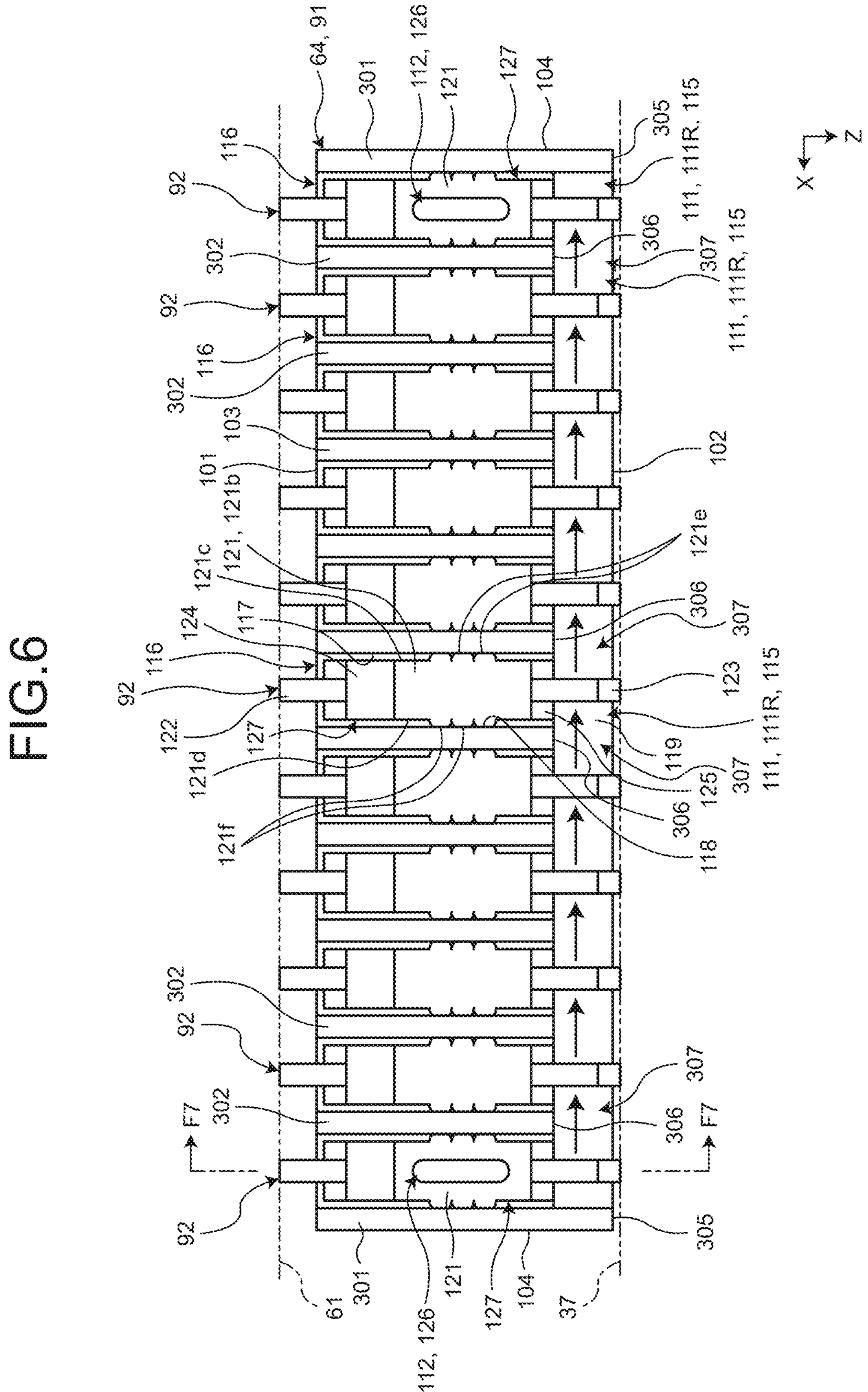
FIG. 6 is an exemplary side view illustrating a relay connector according to a third embodiment.

Hereinafter, a third embodiment will be described with reference to FIGS. 6 and 7. FIG. 6 is an exemplary side view illustrating a relay connector 64 according to the third embodiment. As illustrated in FIG. 6, a holder 91 according to the third embodiment includes a plurality of side walls 301 and 302 instead of a plurality of side walls 114. The side walls 301 and 302 are substantially equivalent to side walls 201 except the respects to be described below.

The plurality of side walls 301 and 302 is arranged in two rows in a Y direction. Two side walls 301 are provided at both ends of the rows of the side walls 301 and 302. The plurality of side walls 302 is arranged in the Y direction between the two side walls 301.

The side wall 301 has an end surface 305. The end surface 305 is positioned at the end of the side wall 301 in a +Z direction. In the Z direction, the end surface 305 is substantially at the same position as a bottom surface 102 of the holder 91, and is included in the bottom surface 102. In other words, the side wall 301 includes a part of the bottom surface 102 of the holder 91.

The side wall 302 is shorter than the side wall 301 in the Z direction. The side wall 302 has an end surface 306. The end surface 306 is positioned at the end of the side wall 302 in the +Z direction. The end surface 306 is spaced apart from the bottom surface 102 in a −Z direction.

Figure 7:
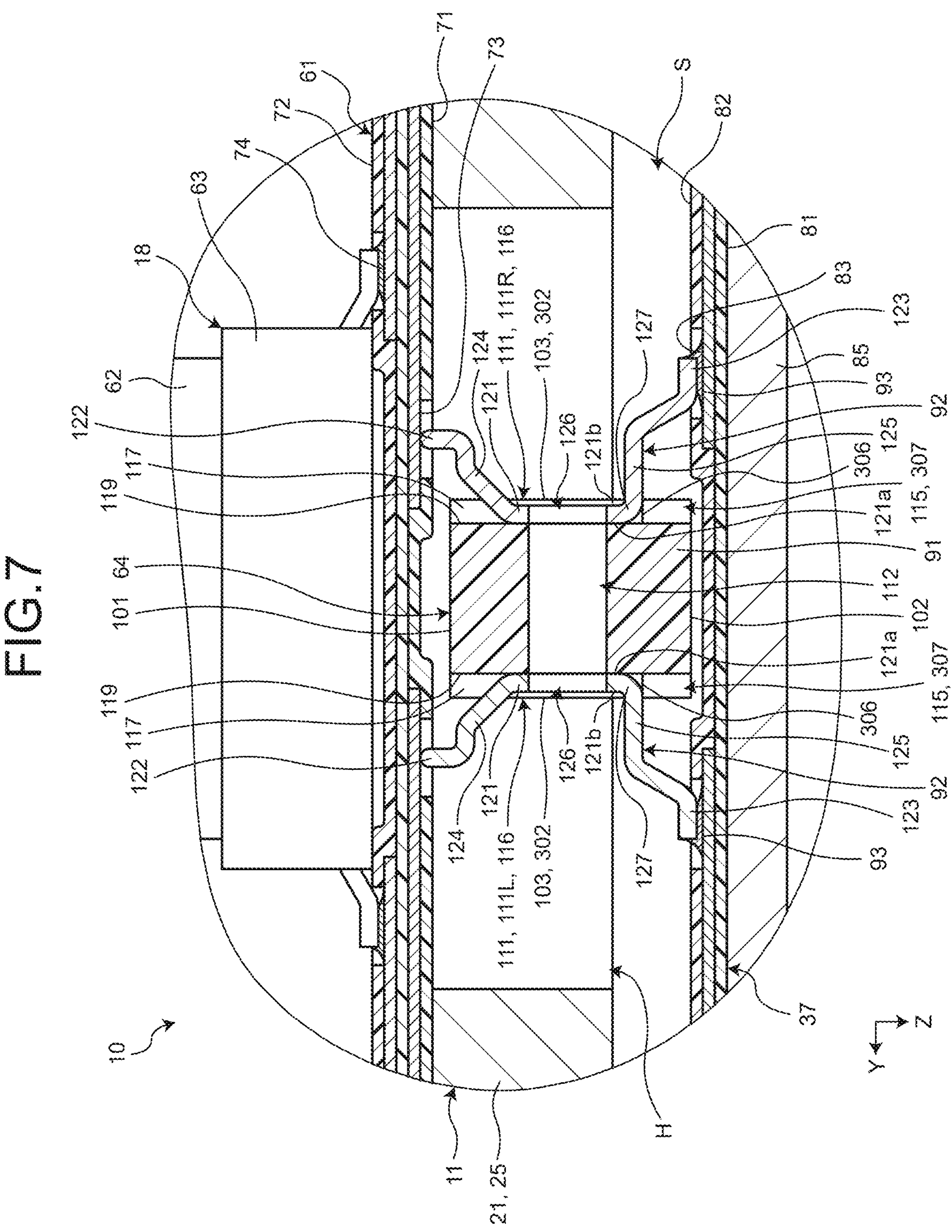
FIG. 7 is an exemplary cross-sectional view illustrating a part of an HDD according to the third embodiment along line F7-F7 in FIG. 6.

FIG. 7 is an exemplary cross-sectional view illustrating a part of an HDD 10 according to the third embodiment along line F7-F7 in FIG. 6. As illustrated in FIG. 7, a cutout 307 is provided between the end surface 306 and a surface 82 of an FPC 37. A side surface 119 of the holder 91 and the end surface 306 of the side wall 302 define the cutout 307.

As in the first embodiment, side surfaces 117, 118, and 119 define an upper groove 116. Meanwhile, in the third embodiment, the side surface 119 of the holder 91 and a connecting part 125 of a lead 92 define a lower groove 115.

As illustrated in FIG. 6, every two adjacent lower grooves of the plurality of lower grooves 115 communicate with each other through the cutout 307. In other words, the lower groove 115 is open in at least one of the +X direction and the −X direction. The +X direction and the −X direction are examples of a fifth direction.

For example, as schematically indicated by an arrow in FIG. 6, a cleaning solution may flow in the X direction through the plurality of lower grooves 115. Thus, the cleaning solution may clean the narrow gap between the terminal 123 and the FPC 37, for example.

In the HDD 10 according to the third embodiment as described above, the lower groove 115 is open in the X direction (+X direction and −X direction) intersecting the +Z direction and the −Y direction. Thus, the cleaning solution may flow not only in the +Z direction and the −Y direction but also in the X direction. In this manner, the HDD 10 according to the present embodiment can further ensure that the holder 91 and the lead 92 are properly cleaned.

Fourth Embodiment

Figure 8:
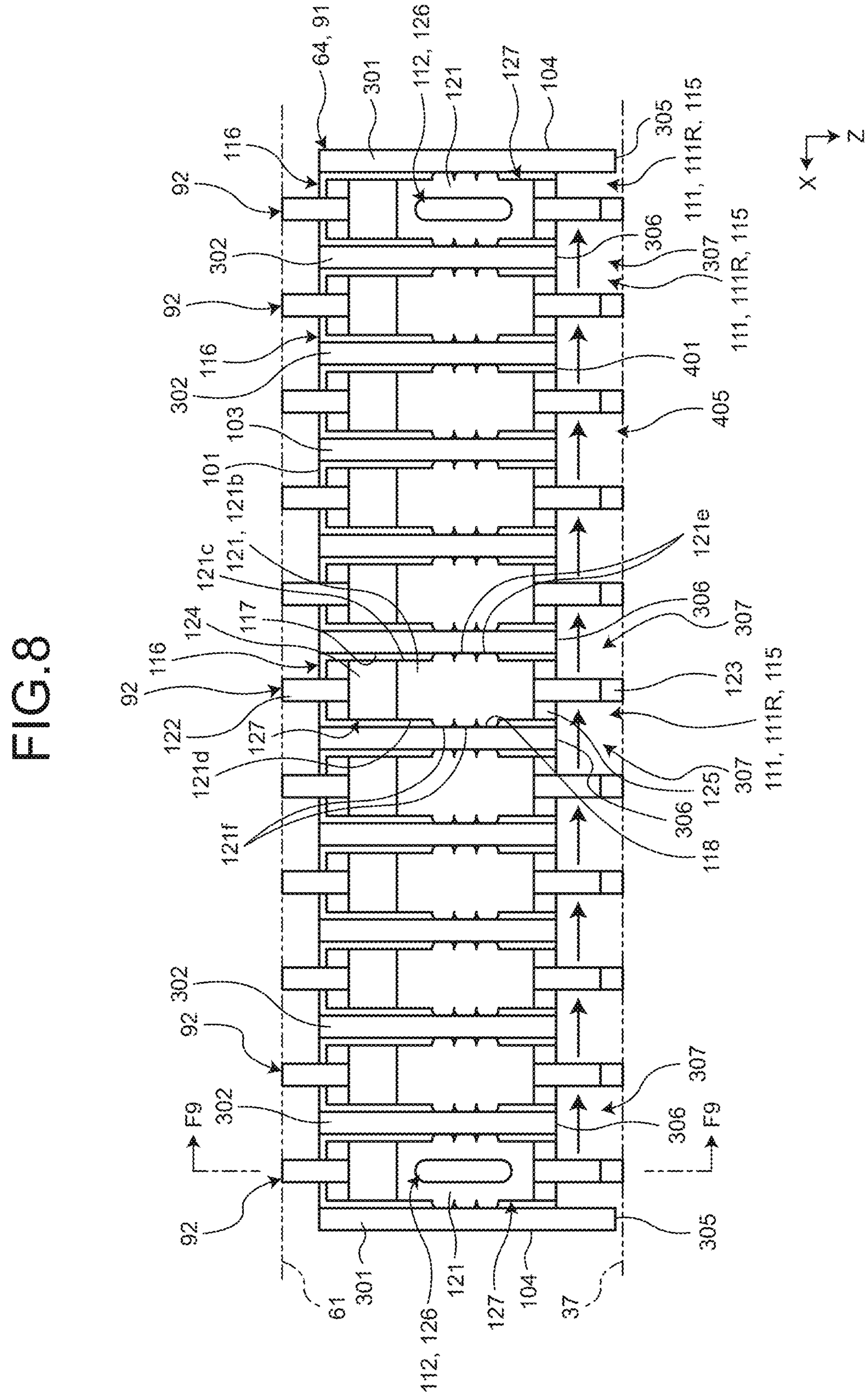
FIG. 8 is an exemplary side view illustrating a relay connector according to a fourth embodiment.

Hereinafter, a fourth embodiment will be described with reference to FIGS. 8 and 9. FIG. 8 is an exemplary side view illustrating a relay connector 64 according to the fourth embodiment. As illustrated in FIG. 8, a holder 91 according to the fourth embodiment includes a plurality of side walls 301 and 302 instead of a plurality of side walls 114.

The holder 91 according to the fourth embodiment has a bottom surface 401 instead of a bottom surface 102. The bottom surface 401 is substantially equivalent to the bottom surface 102 except the respects to be described below. The bottom surface 401 is spaced apart from an end surface 305 of the side wall 301 in a −Z direction.

In the Z direction, an end surface 306 of the side wall 302 is substantially at the same position as the bottom surface 401, and is included in the bottom surface 401. In other words, the side wall 302 includes a part of the bottom surface 401 of the holder 91. Note that the end surface 306 of the side wall 302 may be spaced apart from the bottom surface 401 in the −Z direction.

Figure 9:
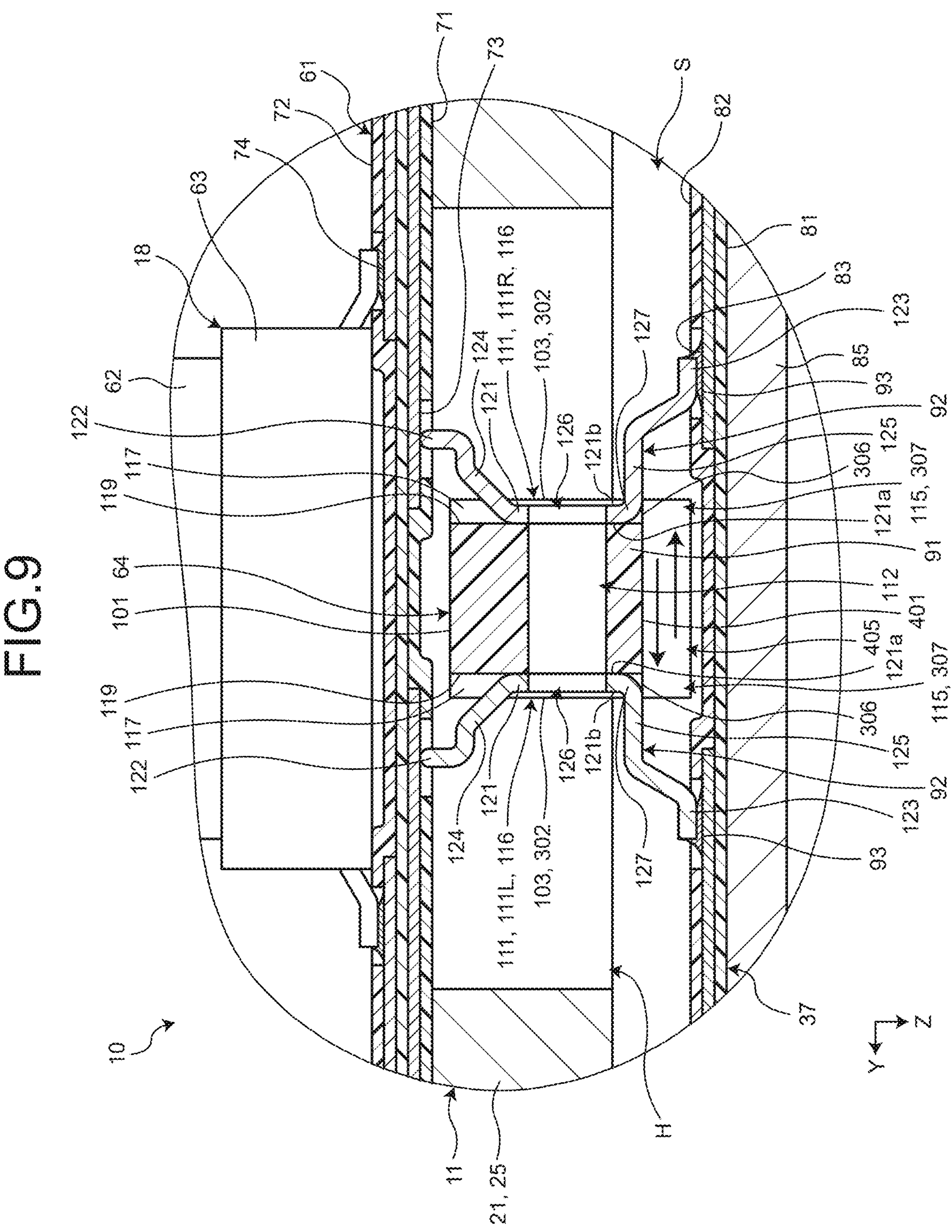
FIG. 9 is an exemplary cross-sectional view illustrating a part of an HDD according to the fourth embodiment along line F9-F9 in FIG. 8.

FIG. 9 is an exemplary cross-sectional view illustrating a part of an HDD 10 according to the fourth embodiment along line F9-F9 in FIG. 8. As illustrated in FIG. 9, the bottom surface 401 faces a surface 82 of an FPC 37 with a gap 405.

In the fourth embodiment, a lower groove 115 is provided between a connecting part 125 of a lead 92 and the surface 82 of the FPC 37. Furthermore, a cutout 307 is provided between the end surface 306 of the side wall 302 and the surface 82 of the FPC 37.

Every two adjacent ones of the plurality of lower grooves 115 in the X direction communicate with each other through the cutout 307. Furthermore, the plurality of lower grooves 115 and the gap 405 are adjacent to and in communication with each other in the Y direction. In other words, the plurality of lower grooves 115 communicate with each other through the gap 405.

For example, as schematically indicated by arrows in FIGS. 8 and 9, a cleaning solution may flow in the X direction and the Y direction through the gap 405. Thus, the relay connector 64 may suppress residues of the cleaning solution and flux between the relay connector 64 and the FPC 37.

In the HDD 10 according to the fourth embodiment as described above, the holder 91 has the bottom surface 401 facing the FPC 37 with the gap 405 therebetween. The lower groove 115 communicates with the gap 405. Such a configuration allows the cleaning solution to flow not only through the lower groove 115 but also through the gap 405 between the FPC 37 and the bottom surface 401. As such, the HDD 10 according to the present embodiment can further ensure that the gap between the FPC 37 and the bottom surface 401 is properly cleaned, with less or no residues remaining in the gap 405.

Fifth Embodiment

Figure 10:
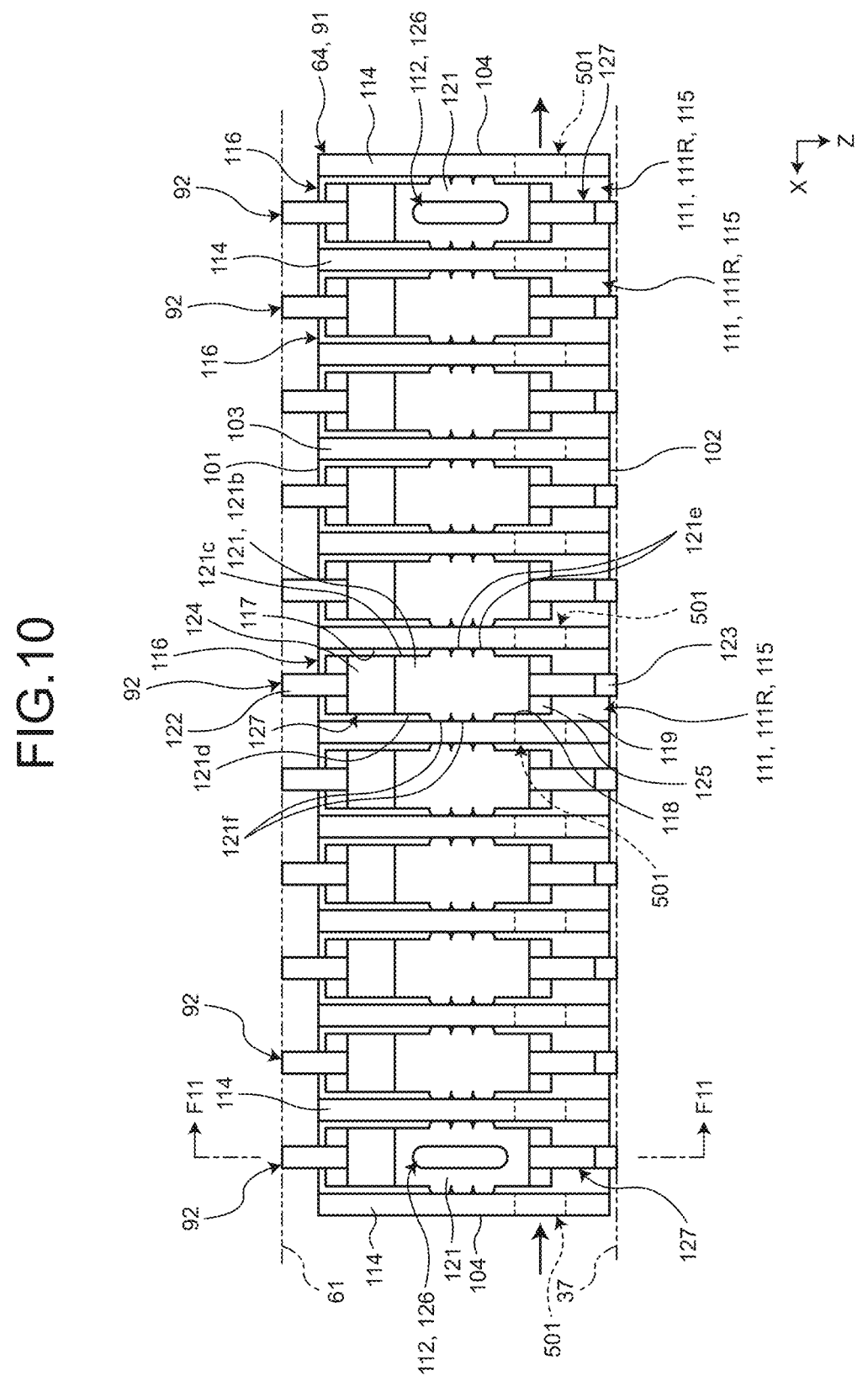
Figure 11:
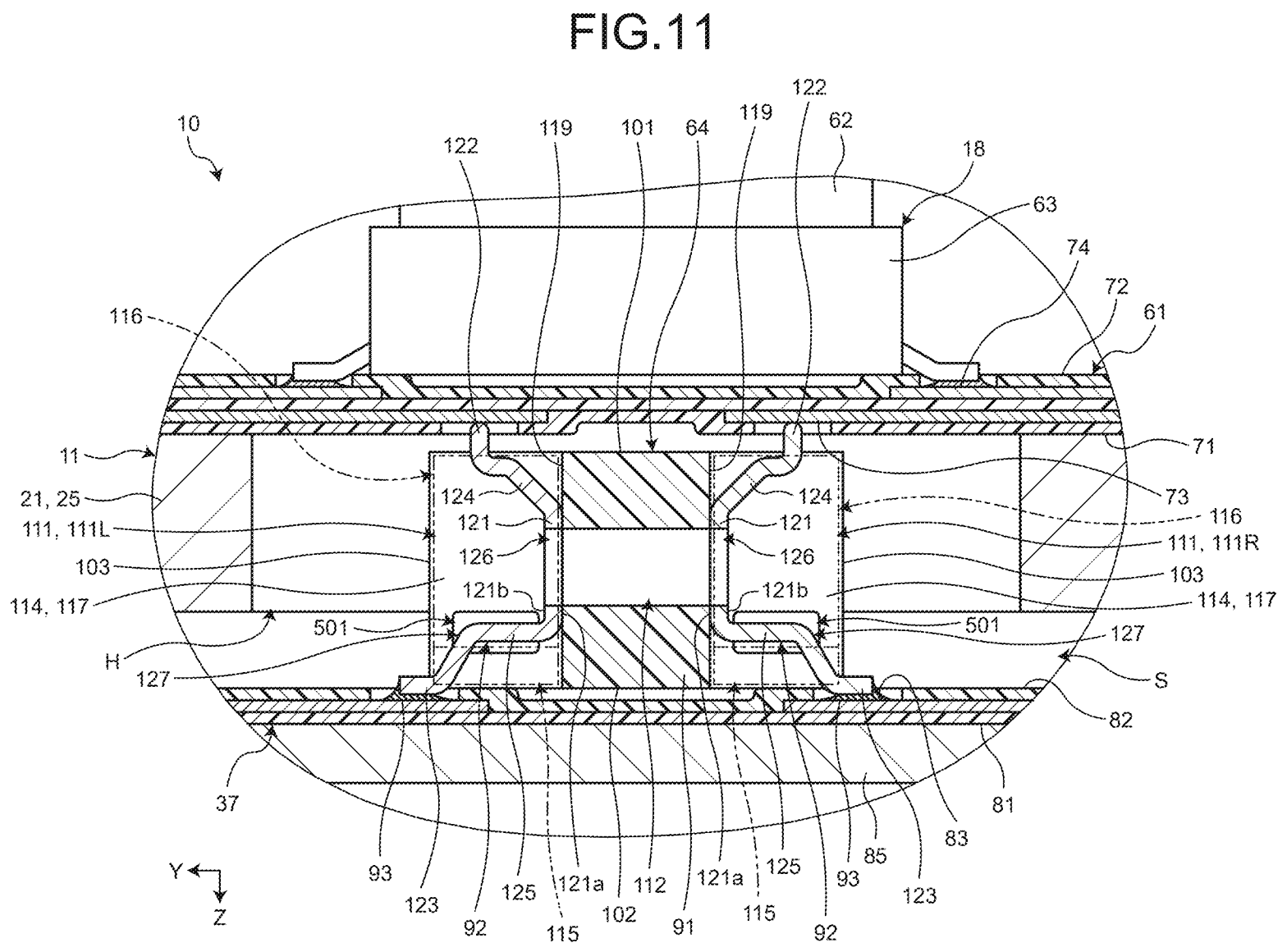

Hereinafter, a fifth embodiment will be described with reference to FIGS. 10 and 11. FIG. 10 is an exemplary side view illustrating a relay connector 64 according to the fifth embodiment. FIG. 11 is an exemplary cross-sectional view illustrating a part of an HDD 10 according to the fifth embodiment along line F11-F11 in FIG. 10. As illustrated in FIG. 11, a through hole 501 is provided in a side wall 114 according to the fifth embodiment. The through hole 501 is an example of a first through hole.

As illustrated in FIG. 10, the through hole 501 penetrates the side wall 114 substantially in an X direction, and opens to side surfaces 117 and 118. The through hole 501 communicates with both a lower groove 115 and an upper groove 116, for example. Note that the through hole 501 may communicate with one of the lower groove 115 and the upper groove 116.

For example, as schematically indicated by an arrow in FIG. 10, a cleaning solution may flow in a plurality of grooves 111 in the X direction through the through hole 501. Thus, the relay connector 64 may suppress residues of the cleaning solution and flux in the grooves 111. In addition, ultrasonic waves may be transmitted to the plurality of grooves 111 through the through hole 501.

In the HDD 10 according to the fifth embodiment as described above, the holder 91 has the two side surfaces 117 and 118 facing each other to define the upper groove 116. The holder 91 is provided with the through hole 501 opening to at least one of the two side surfaces 117 and 118. Such an arrangement allows the cleaning solution to flow into the upper groove 116 through the through hole 501 and flow out from the upper groove 116. In this manner, the cleaning solution can more efficiently clean the upper groove 116.

Sixth Embodiment

Figure 12:
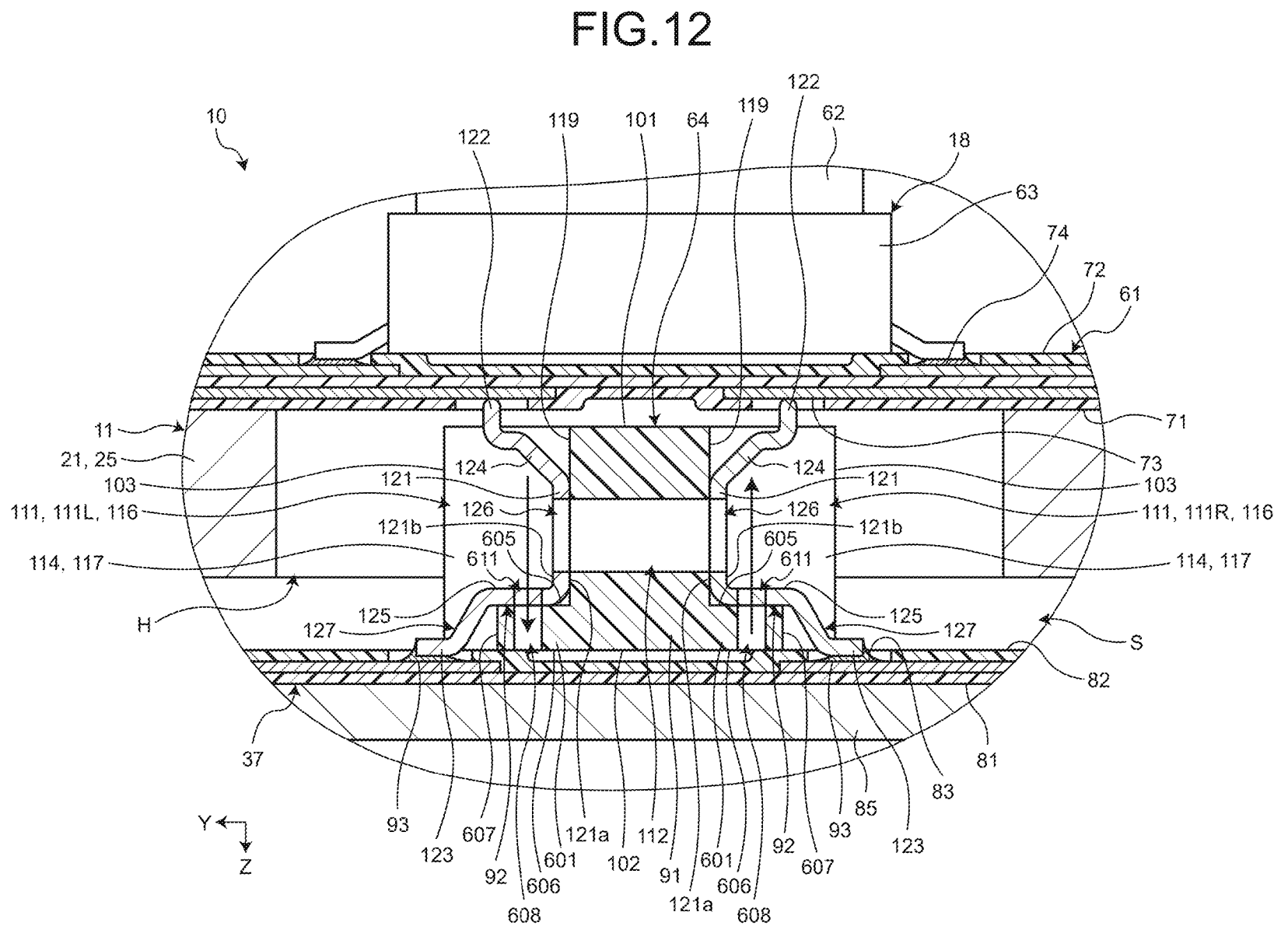

Hereinafter, a sixth embodiment will be described with reference to FIG. 12. FIG. 12 is an exemplary cross-sectional view illustrating a part of an HDD 10 according to the sixth embodiment. As illustrated in FIG. 12, a holder 91 according to the sixth embodiment has a plurality of bottom walls 601. The bottom wall 601 is an example of a wall.

The bottom wall 601 lies between a connecting part 125 of a lead 92 and a surface 82 of an FPC 37, and protrudes from a side surface 119. The bottom wall 601 is connected to side surfaces 117 and 118. The bottom wall 601 includes a top surface 605, a bottom surface 606, and an outer surface 607. The bottom surface 606 is an example of a second end surface.

The top surface 605, the bottom surface 606, and the outer surface 607 are substantially flat. The top surface 605 is at the end of the bottom wall 601 in a −Z direction, and faces substantially in the −Z direction. The bottom surface 606 is at the end of the bottom wall 601 in a +Z direction, and faces substantially in the +Z direction. In other words, the bottom surface 606 is opposite the top surface 605. The outer surface 607 of the bottom wall 601 in a groove 111R is positioned at the end of the bottom wall 601 in a −Y direction, and faces substantially in the −Y direction.

The top surface 605 is spaced apart from a top surface 101 of the holder 91 in the +Z direction. In the sixth embodiment, the side surfaces 117 and 118 and the top surface 605 define an upper groove 116. The top surface 605 supports, for example, the connecting part 125 of the lead 92. Note that the top surface 605 may be spaced apart from the connecting part 125.

In the Z direction, the bottom surface 606 is substantially at the same position as a bottom surface 102 of the holder 91, and is included in the bottom surface 102. In other words, the bottom wall 601 includes a part of the bottom surface

102 of the holder 91. Note that the bottom surface 606 may be spaced apart from the bottom surface 102 of the holder 91 in the +Z direction.

The outer surface 607 of the bottom wall 601 in the groove 111R is spaced apart from an outer surface 103 of the holder 91 in a +Y direction. That is, the bottom wall 601 is shorter than a side wall 114 in the Y direction. Note that the length of the bottom wall 601 in the Y direction may be equal to or longer than the length of the side wall 114. The outer surface 607 faces a terminal 123.

In the sixth embodiment, the holder 91 is provided with a passage 608 instead of the lower grooves 115. The passage 608 is a hole that penetrates the bottom wall 601 substantially in the Z direction, and is an example of a through hole. The passage 608 opens to the top surface 605 and the bottom surface 606. Thus, the passage 608 is provided between the connecting part 125 of the lead 92 and the surface 82 of the FPC 37, and is opened in the +Z direction. Furthermore, the upper groove 116 communicates with the end of the passage 608 in the −Z direction.

The connecting part 125 of the lead 92 is provided with a through hole 611. The through hole 611 is an example of a third through hole. The through hole 611 penetrates the connecting part 125 substantially in the Z direction, and communicates with the passage 608 of the bottom wall 601.

For example, as schematically indicated by an arrow in FIG. 12, a cleaning solution may flow through the through hole 611 of the lead 92 and the passage 608 of the bottom wall 601. Thus, the relay connector 64 may suppress residues of the cleaning solution and flux between the relay connector 64 and the FPC 37.

In the HDD 10 according to the sixth embodiment as described above, the holder 91 is provided with the upper groove 116 and the passage 608. The upper groove 116 opens to the top surface 101 and the outer surface 103. The passage 608 opens to the bottom surface 606 (bottom surface 102), and communicates with the upper groove 116. Thus, during cleaning of the FPC 37 with the cleaning solution, the holder 91 is less likely to hinder the flow of the cleaning solution than the holder 91 with no passage 608. As such, the HDD 10 according to the present embodiment can further ensure that the holder 91 and the lead 92 are properly cleaned.

The holder 91 has the bottom wall 601 located between the connecting part 125 and the FPC 37. The passage 608 penetrates the bottom wall 601. As a result, the bottom wall 601 can position the lead 92. The cleaning solution can flow into and flow out of the upper groove 116 through the passage 608 penetrating the bottom wall 601.

The connecting part 125 is provided with the through hole 611 communicating with the passage 608. Thus, the cleaning solution can flow into the upper groove 116 from the passage 608 and flow out from the upper groove 116 to the passage 608 through the through hole 611. In other words, the connecting part 125 can be avoided from closing the passage 608.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:

a first substrate that includes a first pad;

a second substrate that includes a second pad and is spaced apart from the first substrate in a first direction;

a holder located between the first substrate and the second substrate, the holder provided with a passage opening in the first direction, and a recess communicating with an end of the passage in a second direction opposite the first direction and opening in the second direction and in a third direction that intersects the second direction; and a lead that includes a first part spaced apart from the first substrate and the second substrate, a second part spaced apart from the first substrate and the second substrate, and spaced apart from the first part in the first direction, a first terminal that extends from an end of the first part in the third direction to abut on the first pad, a second terminal that extends from an end of the second part in the third direction to be joined to the second pad, and a third part that is disposed in the recess and connects an end of the first part and an end of the second part in a fourth direction opposite the third direction, wherein the passage extends between the second part and the second substrate.

2. The disk device according to claim 1, wherein the third part is attached to the holder.

3. The disk device according to claim 2, wherein the holder has two first side surfaces that face each other to define the recess, the third part has two opposing edges that face the two first side surfaces, and a plurality of protrusions that protrudes from the two edges to abut on the two first side surfaces, and the third part is held between the two first side surfaces.

4. The disk device according to claim 3, wherein the second part is at least partially disposed in the recess, and is spaced apart from the two first side surfaces.

5. The disk device according to claim 1, wherein at least a part of the first part, at least a part of the second part, the first terminal, and the second terminal are located outside the recess.

6. The disk device according to claim 1, wherein the holder has two first side surfaces that face each other to define the recess, and the holder is provided with a first through hole opening to at least one of the two first side surfaces.

7. The disk device according to claim 1, wherein the holder has a second side surface at an end of the recess in the fourth direction, the second side surface facing the third part, and the holder is provided with a flow path opening to the second side surface.

8. The disk device according to claim 7, wherein the third part is provided with a second through hole communicating with the flow path.

9. The disk device according to claim 1, wherein the holder has two first side surfaces that face each other, and a second side surface that connects ends of the two first side surfaces in the fourth direction, and the two first side surfaces and the second side surface define the passage and the recess.

10. The disk device according to claim 1, wherein the holder has a wall located in-between the second part and the second substrate, and the passage penetrates the wall.

11. The disk device according to claim 10, wherein the second part is provided with a third through hole communicating with the passage.

12. The disk device according to claim 1, wherein the lead is elastically deformed so that the first part and the second part are closer to each other.

13. The disk device according to claim 1, wherein the passage is open in a fifth direction that intersects the first direction and the third direction.

14. The disk device according to claim 1, wherein the holder has a bottom surface that faces the second substrate with a gap, and the passage communicates with the gap.

15. The disk device according to claim 1, further comprising:

a magnetic disk;

a magnetic head configured to read and write information from and to the magnetic disk;

a housing provided with an internal space in which the magnetic disk and the magnetic head are disposed, and a fourth through hole that allows the internal space to communicate with an outside; and a controller located outside the housing and configured to control the magnetic head, wherein the first substrate closes the fourth through hole, and the second substrate includes a flexible printed wiring board.

16. A disk device comprising:

a first substrate that includes a first pad;

a second substrate that includes a second pad and is spaced apart from the first substrate;

a holder located between the first substrate and the second substrate, the holder having a first end surface that faces the first substrate, a second end surface that faces the second substrate, and an outer surface that extends between the first end surface and the second end surface, the holder being provided with a groove dented from the outer surface in a direction and opening to the first end surface and the second end surface; and a lead attached to the holder, the lead including a first terminal that abuts on the first pad, a second terminal joined to the second pad, and a fourth part disposed in the groove between the first terminal and the second terminal, wherein the holder has an inner end surface at an end of the groove in the direction, the inner end surface extending straight between the first end surface and the second end surface.

17. A disk device comprising:

a first substrate that includes a first pad;

a second substrate that includes a second pad and is spaced apart from the first substrate;

a holder located between the first substrate and the second substrate, the holder having a first end surface that faces the first substrate, a second end surface that faces the second substrate, an outer surface that extends between the first end surface and the second end surface, the holder being provided with a recess opening to the first end surface and the outer surface, and a through hole opening to the second end surface and communicating with the recess; and a lead attached to the holder, including a first terminal that abuts on the first pad, a second terminal joined to the second pad, and a fourth part disposed in the recess between the first terminal and the second terminal.

* * * * *